(12) United States Patent
Keller et al.

(10) Patent No.: US 8,459,218 B2
(45) Date of Patent: Jun. 11, 2013

(54) ADJUSTABLE-STROKE SOLENOID VALVE

(75) Inventors: Robert D. Keller, Davisburg, MI (US);
Robert J. Boychuk, Troy, MI (US);
Keith A. Krett, Shelby Township, MI (US)

(73) Assignee: Eaton Corporation, Cleveland, OH (US)

( * ) Notice: Subject to any disclaimer, the term of this patent is extended or adjusted under 35 U.S.C. 154(b) by 207 days.

(21) Appl. No.: 13/111,241

(22) Filed: May 19, 2011

(65) Prior Publication Data
US 2012/0291727 A1 Nov. 22, 2012

(51) Int. Cl.
*F01L 9/02* (2006.01)
(52) U.S. Cl.
USPC .......... 123/90.12; 123/90.17; 137/625.65
(58) Field of Classification Search
USPC ........... 123/90.17, 90.15, 90.12; 251/129.15; 137/625.6, 625.65
See application file for complete search history.

(56) References Cited

U.S. PATENT DOCUMENTS

| 4,782,862 A | * | 11/1988 | Nguyen | 137/630.14 |
| 5,642,756 A | | 7/1997 | Lawrence et al. | |
| 7,341,033 B2 | | 3/2008 | Yoshijima et al. | |
| 2004/0144349 A1 | | 7/2004 | Wampula et al. | |
| 2006/0027199 A1 | | 2/2006 | Yoshijima et al. | |
| 2007/0108401 A1 | | 5/2007 | Shibata et al. | |
| 2009/0189104 A1 | | 7/2009 | Bamber | |
| 2010/0320407 A1 | | 12/2010 | Beneker et al. | |
| 2011/0284782 A1 | | 11/2011 | Boychuk et al. | |

FOREIGN PATENT DOCUMENTS

| CH | 419756 A | 8/1966 |
| DE | 9300848 U1 | 5/1994 |
| EP | 0728655 A2 | 8/1996 |
| JP | 62199911 A | 9/1987 |

\* cited by examiner

*Primary Examiner* — Zelalem Eshete
(74) *Attorney, Agent, or Firm* — Quinn Law Group, PLLC

(57) ABSTRACT

An adjustable-stroke solenoid valve assembly includes supply, control, and exhaust ports, an inner cavity having first and second seats, a solenoid coil, and a plunger assembly. The plunger assembly includes an armature shifted by the coil. The plunger assembly also includes a stem having a first end adjustably engaged with the armature, and a second end adjustably engaged with a poppet. The plunger assembly additionally includes a first surface that gets pressed against the first seat to block fluid flow to the control port when the coil is de-energized and a second surface that gets pressed against the second seat to facilitate fluid flow to the control port when the coil is energized. Adjustment of the stem's first end relative to the armature and of the poppet on the stem's second end establish a predetermined stroke for the plunger assembly and a predetermined fluid flow rate to the control port.

20 Claims, 3 Drawing Sheets

ADJUSTABLE-STROKE SOLENOID VALVE

TECHNICAL FIELD

The present disclosure relates to an adjustable-stroke solenoid valve.

BACKGROUND

A valve is a device that regulates the flow of a fluid by opening, closing, or partially obstructing various passageways. Some valves are operated manually, while others are configured to operate automatically in response to changing conditions with the subject fluid passage. Valves may be used in complex automatic control systems and may require an actuator, such as a solenoid, to actuate a particular valve based on an external input.

Valves are employed in a multitude of industries and are often used to regulate flows of various fluids in motor vehicles. In vehicle internal combustion engines, valves are commonly employed for regulating flows of coolant and oil. For example, solenoid controlled valves may be used to regulate pressurized oil for switching latch pins in hydraulic valve lifters, lash adjusters, etc., in engine valve train systems.

SUMMARY

An adjustable-stroke solenoid valve assembly includes a valve body that defines a supply port configured to introduce a fluid into the valve body, and a control port and an exhaust port each configured to expel at least a portion of the fluid from the valve assembly. The valve body also defines an inner cavity having a first seat and a second seat, wherein the inner cavity is configured to fluidly connect the supply, control, and exhaust ports. The solenoid valve assembly also includes a solenoid coil configured to be selectively energized and de-energized and a plunger assembly arranged within the inner cavity.

The plunger assembly includes an armature configured to be shifted when the coil is energized. The plunger assembly also includes a stem having a first end and a second end, wherein the first end is engaged with the armature and is configured to be adjusted relative to the armature. The plunger assembly additionally includes a poppet engaged with the second end of the stem, wherein the position of the poppet is configured to be adjusted on the stem.

The plunger assembly additionally includes a first surface configured to be pressed against the first seat and block flow of the fluid from the supply port to the control port when the solenoid coil is de-energized. Furthermore, the plunger assembly includes a second surface configured to be pressed against the second seat to facilitate flow of the fluid from the supply port to the control port when the solenoid coil is energized. The adjustment of the first end of the stem relative to the armature and of the poppet on the second end establish a predetermined stroke for the plunger assembly and a predetermined flow rate of the fluid to the control port.

According to one embodiment, an internal combustion engine includes a valve train having a latch pin configured to deactivate an engine valve. The engine also includes the above described adjustable-stroke solenoid valve assembly for shifting the latch pin and deactivating the engine valve when the solenoid coil is energized. The solenoid valve assembly is secured to a surface of the engine.

The above features and advantages and other features and advantages of the present invention are readily apparent from the following detailed description of the best modes for carrying out the invention when taken in connection with the accompanying drawings.

DETAILED DESCRIPTION

Figure 1:
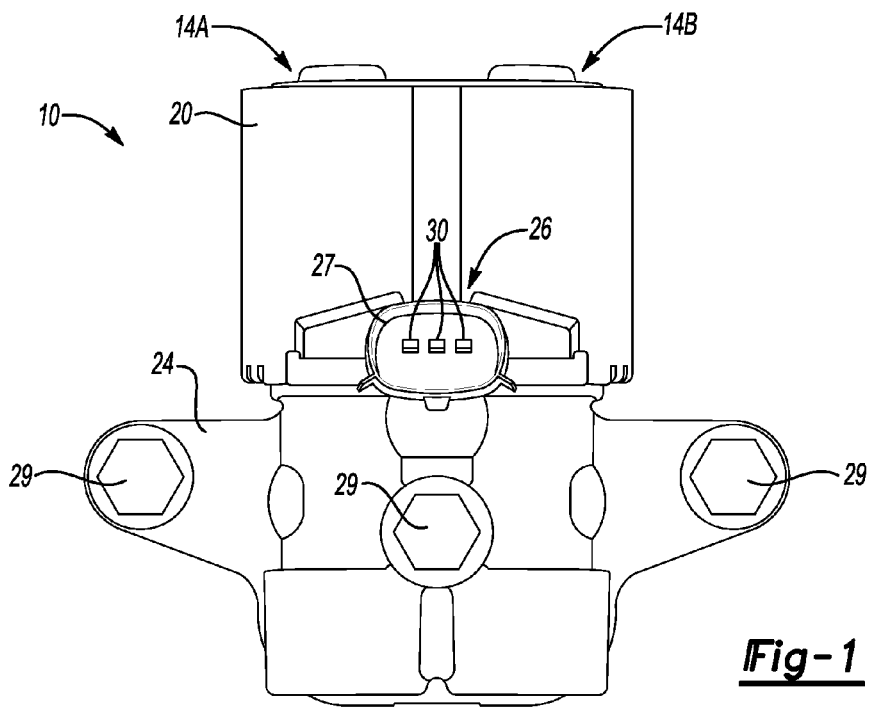
FIG. 1 is a schematic plan view of a solenoid valve module incorporating two adjustable-stroke solenoid valve assemblies, with the view illustrating a connector side of the module.
Figure 2:
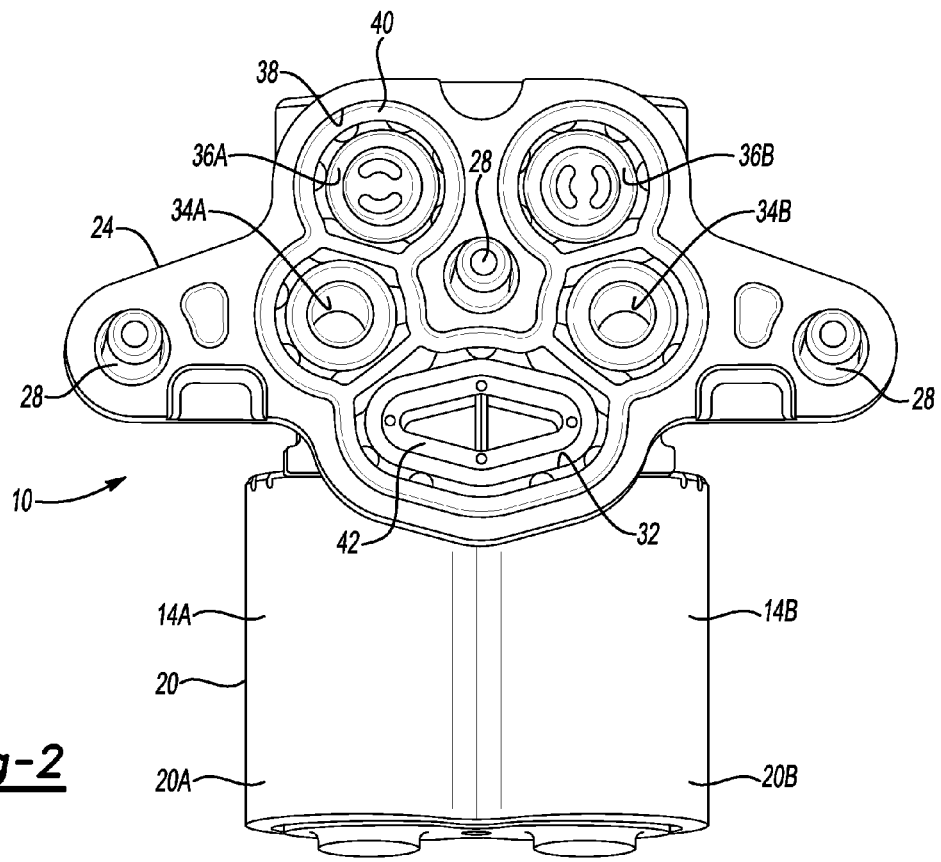
FIG. 2 is a schematic plan view of the solenoid valve module shown in FIG. 1, with the view illustrating a supply port side of the module.

Referring to the drawings, wherein like reference numbers refer to like components, FIGS. 1 and 2 illustrate a solenoid valve module 10 configured to regulate operation of a switching mechanism. For example, and as will be used for describing the operation of the solenoid valve module 10, the subject mechanism may include latch pins for deactivating lifters and lash adjusters that control the opening and closing of intake and exhaust valves in a valve train of an internal combustion engine. Under reduced engine loads, such deactivation or locking out of engine valves may be used to disable operation of selected engine cylinders and provide improved engine efficiency. Accordingly, as shown schematically in FIG. 3, the solenoid valve module 10 may be installed on or in an engine 12 to control operation of the latch pins in the subject engine's valve train.

The solenoid valve module 10 includes a first adjustable-stroke solenoid valve assembly 14A and a second adjustable-stroke solenoid valve assembly 14B. Although shown as having two solenoid valve assemblies 14A and 14B, nothing precludes the solenoid valve module 10 from incorporating either greater or fewer solenoid valve assemblies. The first solenoid valve assembly 14A includes a first solenoid portion 16A and a first valve body 18A, and the second solenoid valve assembly 14B includes a second solenoid portion 16B and a second valve body 18B. The first and second solenoid portions 16A and 16B and the first and second valve bodies 18A and 18B are located within the solenoid valve module 10. The first solenoid valve assembly 14A and the second solenoid valve assembly 14B operate in a typical manner to provide fluid control as is known in the art.

Figure 4:
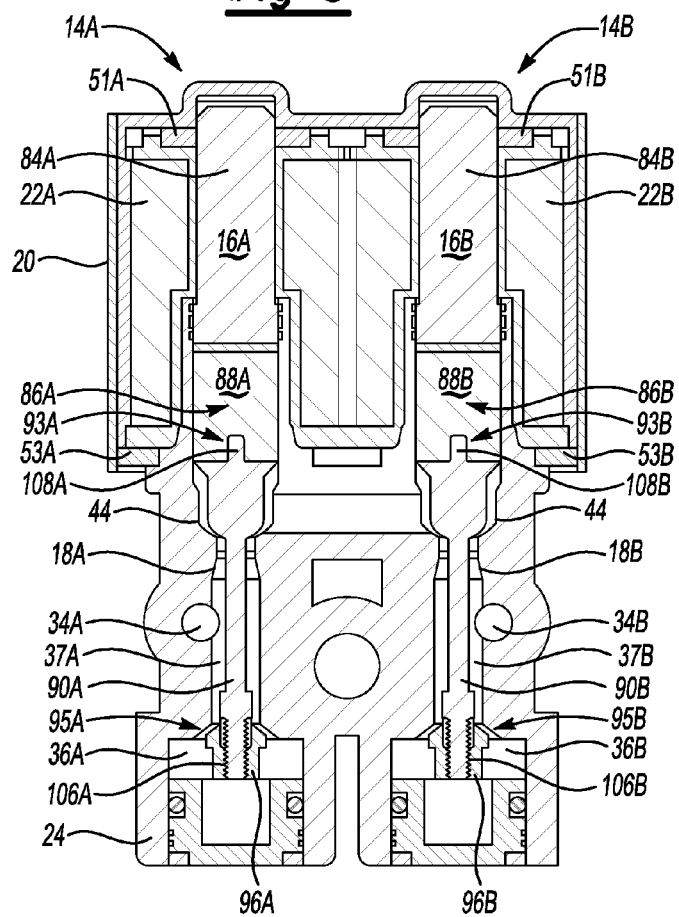
FIG. 4 is a schematic cross-sectional front view of the solenoid valve module of FIGS. 1-3.

Referring to FIGS. 1-2 and 4, the solenoid valve module 10 is shown to include a solenoid can 20 that houses a first solenoid coil 22A that is configured to be selectively energized and de-energized to power the first solenoid valve assembly 14A. Additionally, the solenoid valve module 10 is shown to include a second solenoid coil 22B that is configured to be selectively energized and de-energized to power the second solenoid valve assembly 14B. The valve body 18A and the valve body 18B are integrally formed into a solenoid housing 24. The solenoid can 20 and the solenoid housing 24 may be secured to one another. Although the solenoid can 20 is illustrated as a single component, the solenoid can 20 may include separate, multiple components, such as a first solenoid can portion 20A to cover the first solenoid valve assembly 14A and a second solenoid can portion 20B to cover the second solenoid valve assembly 14B. An electrical connector 26 may also be secured to either or both of the solenoid can 20 and the solenoid housing 24.

The solenoid valve module 10 includes the solenoid can 20, the solenoid housing 24 and the connector housing 26 and may be assembled onto the engine 10 as a single assembly. The solenoid valve module 10, therefore, provides a completely contained control valve for a hydraulic control circuit 13 for the engine 12.

The solenoid housing 24 defines a plurality of attachment apertures 28. A plurality of fasteners 29 may extend through the plurality of apertures 28 to secure the solenoid valve module 10 to the engine 12. In the embodiment shown, there are three attachment apertures 28, but greater or fewer apertures may be used depending on the configuration of the solenoid valve module 10 and the engine 12. The attachment apertures 28 allow for quick and easy installation of the solenoid valve module 10 to the engine 12, which will be explained in greater detail below.

The electrical connector 26 extends from and is mounted to at least one of the solenoid housing 24 and the solenoid can 20. The electrical connector 26 includes a connector housing 27 which surrounds and protects a plurality of connector prongs 30. In the embodiment shown, there are three electrical connector prongs 30, which provide independent electrical control of the first solenoid valve assembly 14A and the second solenoid valve assembly 14B. The electrical connector 26 provides a common electrical attachment of the first solenoid valve assembly 14A and the second solenoid valve assembly 14B to reduce the number of components and simplify wiring of the solenoid valve module 10 to the engine 12. The connector housing 27 may additionally act as a guide to assist in the electrical connection of the solenoid valve module 10 to the engine 12. The connector housing 27 may have an asymmetric shape to ensure correct electrical connection of the connector prongs 30 to the first solenoid valve assembly 14A and the second solenoid valve assembly 14B.

The solenoid housing 24 also defines a supply port 32, a first control port 34A, a second control port 34B, a first exhaust port 36A, a second exhaust port 36B, a first inner cavity 37A, and a second inner cavity 37B. The supply port 32 is configured to introduce a fluid, such as an oil, into the first and second valve bodies 18A, 18B. The first and second control ports 34A, 34B and first and second exhaust ports 36A, 36B are each configured to expel at least a portion of the fluid from the first and second solenoid valve assemblies 14A and 14B, respectively. The first inner cavity 37A is configured to fluidly connect the supply port 32, the first control port 34A, and the first exhaust port 36A. Likewise, the second inner cavity 37B is configured to fluidly connect the supply port 32, the second control port 34B, and the second exhaust port 36B.

Corresponding ports may be formed within the engine 12 to direct fluid from the solenoid valve module 10 to the required location within the engine 12, i.e., to the switch pins for the engine valves, lifters, and lash adjusters. As shown in FIG. 2, a groove 38 may be formed in the solenoid housing 24 to receive a gasket 40. The gasket 40 assists in sealing the solenoid valve module 10 to the engine 12. The portion of the engine 12 to which the solenoid valve module 10 is attached may be machined to facilitate sealing of the solenoid valve module 10 to the engine 12.

As shown in FIG. 2, a filter 42 may be inserted within the supply port 32 to reduce contaminants and debris within the fluid, and preclude the same from entering the first solenoid valve assembly 14A and the second solenoid valve assembly 14B. The supply port 32 extends into a supply gallery 44 (shown in FIG. 4), which is a common supply gallery 44 for the first solenoid valve assembly 14A and the second solenoid valve assembly 14B. The first solenoid valve assembly 14A and the second solenoid valve assembly 14B may be operated independently of one another. Accordingly, the pressure within the supply gallery 44 is sufficient to maintain independent operation of the first solenoid valve assembly 14A and the second solenoid valve assembly 14B.

Figure 3:
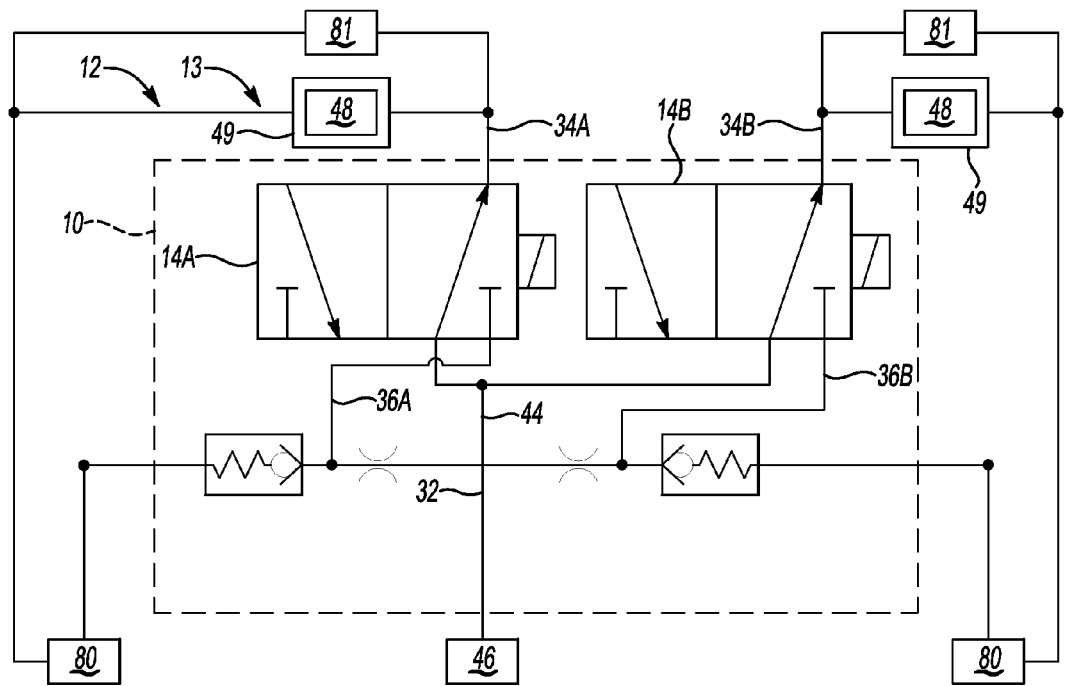
FIG. 3 is a schematic illustration of an internal combustion engine for a vehicle having the solenoid valve module of FIGS. 1 and 2.

Referring to FIGS. 3 and 4, a first embodiment for a method of operating the first solenoid valve assembly 14A and the second solenoid valve assembly 14B is explained. The solenoid valve module 10 controls the flow of oil from an oil supply 46 to latch pins 48 which control the valves, lifters, and lash adjusters, etc., within a valve train 49 of the engine 12. When a particular latch pin 48 is pressurized by the oil, the latch pin is shifted to deactivate the corresponding engine valve. After the latch pins 48, the oil may be channeled to other engine components 81 before returning to an oil sump 80.

Figure 5:
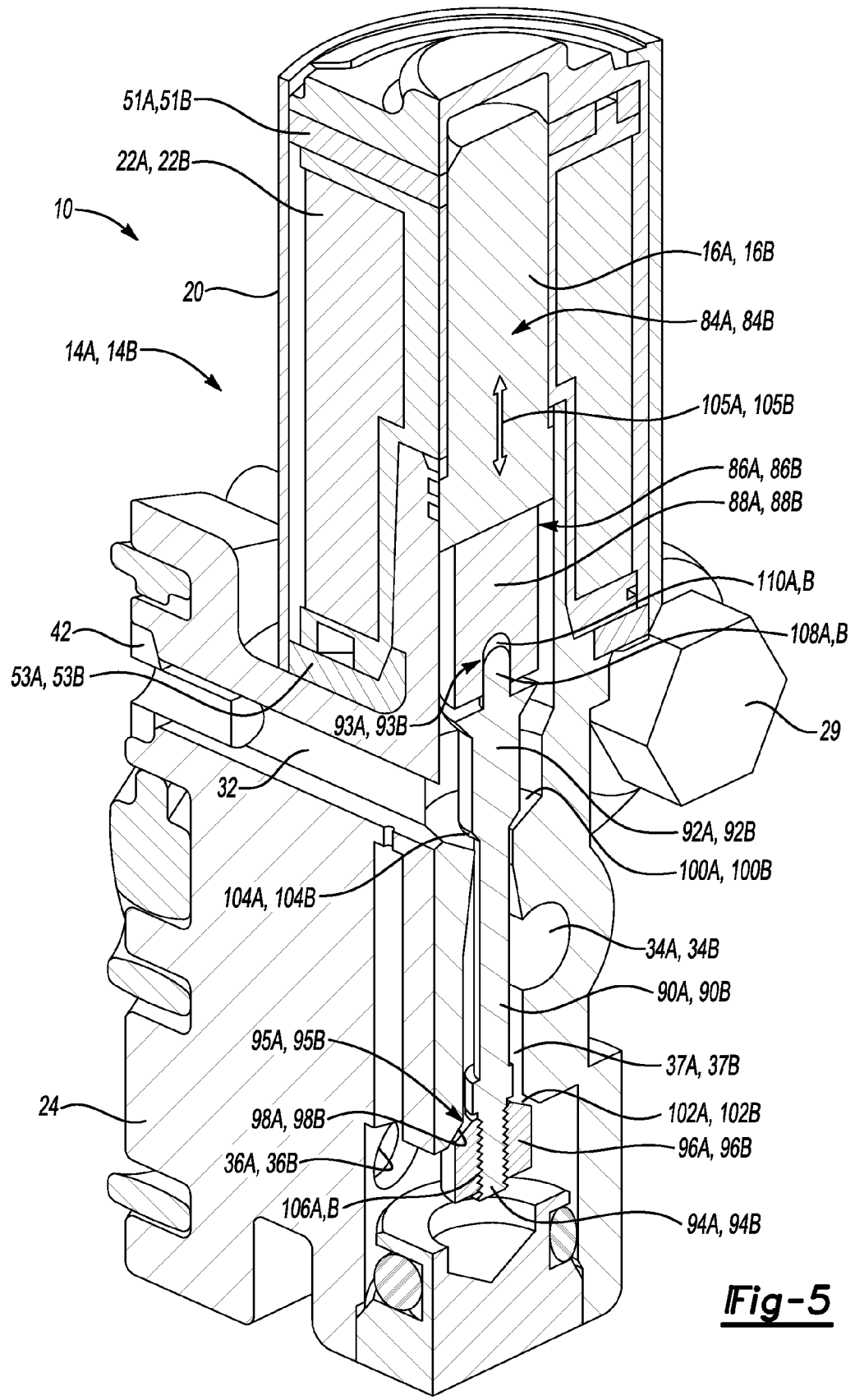
FIG. 5 is a schematic perspective cross-sectional view illustrating an adjustable plunger assembly for the solenoid valve module of FIGS. 1-4.

As shown in FIGS. 4-5, the first solenoid valve assembly 14A has a first flux circuit formed by a first top flux collector 51A, a first pole piece 84A, a first bottom flux collector 53A, and a first plunger assembly 86A. The first plunger assembly 86A is arranged within the first inner cavity 37A and includes a first armature 88A, a first stem 90A having a first end 92A and a second end 94A, and a first poppet 96A. The first armature 88A, and, as a result, the entire first plunger assembly 86A, is configured to be shifted when the first coil 22A is energized.

As shown in FIGS. 4-5, the first end 92A of the first stem 90A is engaged with the first armature 88A and is configured to be adjusted relative to the first armature and generate a first calibrated engagement interface 93A. The first calibrated engagement interface 93A represents an adjustable distance of engagement between the first end 92A and the first armature 88A. The first calibrated engagement interface 93A is configured to alter the proportions of the first plunger assembly 86A and modify the flow rate of oil through the first control port 34A. The first poppet 96A is engaged with the second end 94A of the first stem 90A and is configured to be adjusted on the first stem 90A and generate a second calibrated engagement interface 95A. The second calibrated engagement interface 95A is a distance of engagement between the second end 94A and the first poppet 96A that alters the proportions of the first plunger assembly 86A and modifies the flow rate of oil through the first control port 34A.

As shown in FIG. 5, the first top flux collector 51A, the first pole piece 84A, the first bottom flux collector 53A, and the first armature 88A are assembled within the solenoid can 20. By selectively energizing and de-energizing the first coil 22A, the first armature 88A is acted upon by the flux to shift the first plunger assembly 86A within the first valve body 18A. The first inner cavity 37A includes a first seat 98A and a second seat 100A. The first plunger assembly 86A also includes a first surface 102A and a second surface 104A. The first surface 102A is configured to be pressed against the first seat 98A by the action of the oil when the first coil 22A is de-energized. Such pressing of the first surface 102A against the first seat 98A blocks the flow of the oil from the supply port 32 to the first control port 34A. The second surface 104A configured to be pressed against the second seat 100A to facilitate flow of the oil from the supply port 32 to the first control port 34A when the first coil 22A is energized. Selection and adjustment of the particular first and second calibrated engagement interfaces 93A, 95A establishes a specific or predetermined stroke 105A for the first plunger assembly 86A. In turn, the predetermined stroke 105A for the first plunger assembly 86A establishes a predetermined required flow rate of the fluid to the first control port 34A.

Likewise, as shown in FIGS. 4-5, the second solenoid valve assembly 14B has a second flux circuit formed by a second top flux collector 51B, a second pole piece 84B, a second bottom flux collector 53B, and a second plunger assembly 86B. The second plunger assembly 86B is arranged within the second inner cavity 37B and includes a second armature 88B, a second stem 90B having a first end 92B and a second end 94B, and a second poppet 96B. The second armature 88B, and, as a result, the entire second plunger assembly 86B, is configured to be shifted when the second coil 22B is energized.

As shown in FIG. 5, the first end 92B of the second stem 90B is engaged with the second armature 88B and is configured to be adjusted relative to the second armature and generate a first calibrated engagement interface 93B. Similar to the first calibrated engagement interface 93A, the second calibrated engagement interface 93B represents an adjustable distance of engagement between the first end 92B and the second armature 88B. The first calibrated engagement interface 93B is configured to alter the proportions of the second plunger assembly 86B and modify the flow rate of oil through the second control port 34B. The second poppet 96B is engaged with the second end 94B of the second stem and is configured to be adjusted on the second stem 90B and generate a second calibrated engagement interface 95B. Similar to the first calibrated engagement interface 93B, the second calibrated engagement interface 95B is a distance of engagement between the second end 94B and the second poppet 96B that alters the proportions of the second plunger assembly 86B and modifies the flow rate of oil through the second control port 34B.

The second top flux collector 51B, the second pole piece 84B, the second bottom flux collector 53B, and the second armature 88B are assembled within the solenoid can 20. By selectively energizing and de-energizing the second coil 22B, the second armature 88B is acted upon by the flux to shift the second plunger assembly 86B within the second valve body 18B. Furthermore, the second inner cavity 37B includes a first seat 98B and a second seat 100B. The second plunger assembly 86B also includes a first surface 102B and a second surface 104B. The first surface 102B is configured to be pressed against the first seat 98B by the action of the oil when the second coil 22B is de-energized. Such pressing of the first surface 102B against the first seat 98B blocks the flow of the oil from the supply port 32 to the second control port 34B. The second surface 104B configured to be pressed against the second seat 100B to facilitate flow of the oil from the supply port 32 to the second control port 34B when the second coil 22B is energized. Selection and adjustment of the particular first and second calibrated engagement interfaces 93B, 95B establishes a specific or predetermined stroke 105B for the second plunger assembly 86B. In turn, the predetermined stroke 105B for the second plunger assembly 86B establishes a predetermined required flow rate of the fluid to the second control port 34B.

With continued reference to FIG. 5, each of the first seats 98A, 98B and second seats 100A, 100B may be characterized by an angled face. The angle on the face of the first seats 98A, 98B and second seats 100A, 100B would facilitate more effective fluid sealing of the respective first and second inner cavities 37A, 37B and more precise regulation of oil flow to the respective first and second control ports 34A, 34B. The first surfaces 102A and 102B may be arranged either on the respective armatures 88A, 88B or on the first ends 92A, 92B of the respective stems 90A and 90B. Accordingly, the first surfaces 102A and 102B are configured to sealably engage the respective first seats 98A and 98B. The second surfaces 104A and 104B may be arranged on the poppets 96A and 96B, respectively, and, accordingly, be configured to sealably engage the corresponding second seats 100A and 100B.

The poppets 96A and 96B may be engaged with and secured to the second ends 94A and 94B, respectively, of the particular stem via a threaded connection 106A, B, as shown in FIG. 5, or a crimped connection, as understood by those skilled in the art. Additionally, if the threaded connection is used, an additional thread locking feature, such as a specialized interference-type thread profile, or an appropriate sealant may be employed to prevent loosening of the connection. Alternatively, the poppets 96A and 96B may be engaged with and secured to the second ends 94A and 94B, respectively, of the particular stem by having the stem pressed into the appropriate poppet. Regardless of the engagement mechanism used, the positions of the poppets 96A, 96B may be adjusted on the respective first and second stem 90A, 90B.

As shown in FIG. 5, each of the first ends 92A and 92B of the respective stems 90A and 90B may include a projection 108A and 108B and the respective armature 88A and 88B may include a complementary receptacle 110A and 110B. In such a case, each of the stem projections 108A and 108B is pressed into the corresponding armature receptacle 110A and 110B and their engagement is adjusted to establish the respective first calibrated engagement interface 93A, 93B. Alternatively, each armature 88A and 88B may include a projection and the respective second ends 94A and 94B of the appropriate stem may include a complementary receptacle such that the armature projection may then be pressed into the corresponding stem receptacle. Although the last configuration is not specifically shown, such a construction may be easily envisioned using the example shown in FIG. 5 and described above. Accordingly, whether the projections are incorporated into the first ends of the stems while the armatures include complementary receptacles, or vice versa, the first ends 92A, 92B of the respective stems 90A, 90B may be adjusted relative to the respective armatures 88A, 88B.

Each of the armatures 88A, 88B, stems 90A, 90B, and poppets 96A, 96B may be formed by at least one of a cold-forming, screw machining, and die casting process. While the armatures 88A, 88B and the poppets 96A, 96B may be formed from such robust but high density materials, such as steel, the stems 90A, 90B may be formed from a distinct material. For example, the stems 90A, 90B may be formed from aluminum such that the density of the stem material is lower than the density of the armature and poppet materials. Such combination of distinct materials would lighten the respective plunger assembly 86A, 86B in order to enhance the assembly's response when the respective coil 22A, 22B is energized without negatively impacting the assembly's reliability. Overall, the adjustable relationship of the armatures 88A, 88B, stems 90A, 90B, and poppets 96A, 96B permits the first and second solenoid valve assemblies 14A, 14B to be conveniently adapted to a variety of valve trains and engines.

During operation, the oil enters the solenoid valve module 10 through a supply port 32 and flows through to a supply gallery 44. When the first solenoid coil 22A or the second solenoid coil 22B is energized, the respective second surface 104A or 104B is pressed against the second seat 100A or 100B, respectively. As a result, the oil flows from the supply gallery 44 to a first control port 34A for the first solenoid valve assembly 14A or to a second control port 34B for the second solenoid valve assembly 14B. According to the noted embodiment, operation of the first solenoid valve assembly 14A varies pressure within the first control port 34A and operation of the second solenoid valve assembly 14B varies pressure within the second control port 34B to control the respective latch pins 48 in the valve train 49 of the engine 12. Oil flow from the latch pins 48 may also flow to the other engine components 81 prior to returning to the oil sump 80.

While the best modes for carrying out the invention have been described in detail, those familiar with the art to which this invention relates will recognize various alternative designs and embodiments for practicing the invention within the scope of the appended claims.

The invention claimed is:

1. An adjustable-stroke solenoid valve assembly comprising:
   a valve body defining a supply port configured to introduce a fluid into the valve body, a control port and an exhaust port each configured to expel at least a portion of the fluid from the valve assembly, and an inner cavity having a first seat and a second seat, wherein the inner cavity is configured to fluidly connect the supply, control, and exhaust ports;
   a solenoid coil configured to be selectively energized and de-energized; and
   a plunger assembly arranged within the inner cavity and having:
      an armature configured to be shifted when the coil is energized;
      a stem having a first end and a second end, wherein the first end is engaged with the armature and is configured to be adjusted relative to the armature;
      a poppet engaged with the second end of the stem, wherein the poppet is configured to be adjusted on the stem;
      a first surface configured to be pressed against the first seat and block flow of the fluid from the supply port to the control port when the solenoid coil is de-energized; and
      a second surface configured to be pressed against the second seat to facilitate flow of the fluid from the supply port to the control port when the solenoid coil is energized;
      wherein the adjustment of the first end of the stem relative to the armature and of the poppet on the second end establish a predetermined stroke for the plunger assembly and a predetermined flow rate of the fluid to the control port.

2. The solenoid valve assembly of claim 1, wherein the first surface is arranged on one of the armature and the first end of the stem.

3. The solenoid valve assembly of claim 1, wherein the second surface is arranged on the poppet.

4. The solenoid valve assembly of claim 1, wherein the first end of the stem includes a projection and the armature includes a receptacle, and wherein the stem projection is pressed into the armature receptacle such that the first end is adjusted relative to the armature.

5. The solenoid valve assembly of claim 1, wherein the armature includes a projection and the first end of the stem includes a receptacle, and wherein the armature projection is pressed into the stem receptacle such that the first end is adjusted relative to the armature.

6. The solenoid valve assembly of claim 1, wherein the poppet is engaged with and secured to the second end of the stem via one of a threaded and a crimped connection.

7. The solenoid valve assembly of claim 1, wherein the poppet is engaged with and secured to the second end of the stem by having the stem pressed into the poppet.

8. The solenoid valve assembly of claim 1, wherein each of the armature, stem, and poppet is formed by at least one of a cold-forming, screw machining, and die casting process.

9. The solenoid valve assembly of claim 1, wherein each of the first and second seats is characterized by an angled face.

10. The solenoid valve assembly of claim 1, wherein the stem is formed from a material that is distinct from materials used for the armature and the poppet, and the density of the stem material is lower than the density of each of the armature and poppet materials.

11. An internal combustion engine comprising:
   an engine valve train having a latch pin configured to deactivate an engine valve; and
   an adjustable-stroke solenoid valve assembly secured to a surface of the engine, the solenoid valve assembly including:
      a valve body defining a supply port configured to introduce a fluid into the valve body, a control port and an exhaust port each configured to expel at least a portion of the fluid from the valve assembly, and an inner cavity having a first seat and a second seat, wherein the inner cavity is configured to fluidly connect the supply, control, and exhaust ports;
      a solenoid coil configured to be selectively energized and de-energized; and
      a plunger assembly arranged within the inner cavity and having:
         an armature configured to be shifted when the coil is energized;
         a stem having a first end and a second end, wherein the first end is engaged with the armature and is configured to be adjusted relative to the armature;
         a poppet engaged with the second end of the stem, wherein the poppet is configured to be adjusted on the stem;
         a first surface configured to be pressed against the first seat and block flow of the fluid from the supply port to the control port when the solenoid coil is de-energized; and
         a second surface configured to be pressed against the second seat to facilitate flow of the fluid from the supply port to the control port when the solenoid coil is energized;
         wherein the adjustment of the first end of the stem relative to the armature and of the poppet on the second end establish a predetermined stroke for the plunger assembly and a predetermined flow rate of the fluid to the control port.

12. The engine of claim 11, wherein the first surface is arranged on one of the armature and the first end of the stem.

13. The engine of claim 11, wherein the second surface is arranged on the poppet.

14. The engine of claim 11, wherein the first end of the stem includes a projection and the armature includes a receptacle, and wherein the stem projection is pressed into the armature receptacle such that the first end is adjusted relative to the armature.

15. The engine of claim 11, wherein the armature includes a projection and the first end of the stem includes a receptacle, and wherein the armature projection is pressed into the stem receptacle such that the first end is adjusted relative to the armature.

16. The engine of claim 11, wherein the poppet is engaged with and secured to the second end of the stem via one of a threaded and a crimped connection.

17. The engine of claim 11, wherein the poppet is engaged with and secured to the second end of the stem by having the stem pressed into the poppet.

18. The engine of claim 11, wherein each of the armature, stem, and poppet is formed by at least one of a cold-forming, screw machining, and die casting process.

19. The engine of claim 11, wherein each of the first and second seats is characterized by an angled face.

20. The engine of claim 11, wherein the stem is formed from a material that is distinct from materials used for the armature and the poppet, and the density of the stem material is lower than the density of each of the armature and poppet materials.

\* \* \* \* \*